United States Patent [19]  
Duckworth

[11] 3,869,860  
[45] Mar. 11, 1975

[54] FLUID FLOW CONTROL VALVES
[75] Inventor: Peter Duckworth, Coventry, England
[73] Assignee: Keelavite Hydraulics Limited, Warwickshire, England
[22] Filed: Jan. 2, 1974
[21] Appl. No.: 430,086

[30] Foreign Application Priority Data
Dec. 29, 1972 Great Britain................. 60064/72

[52] U.S. Cl..................... 60/371, 91/281, 251/324, 60/413
[51] Int. Cl. ......................... F15b 1/02, F16k 11/07
[58] Field of Search ...... 251/324; 91/281, 392, 403; 60/371

[56] References Cited
UNITED STATES PATENTS
2,055,530  9/1936  Hallenbeck..................... 251/324 X
3,186,169  6/1965  Hauser................................. 60/371
3,192,717  7/1965  Lee....................................... 60/371

Primary Examiner—Edgar W. Geoghegan  
Attorney, Agent, or Firm—Oblon, Fisher, Spivak, McClelland & Maier

[57] ABSTRACT

A fluid flow control valve having a piston having a land arranged to move past port means in the cylinder wall, the port means having a dimension in the axial direction which is greater than its dimension in the circumferential direction, for example by consisting of two axially spaced radial bores interconnected within the cylinder wall.

7 Claims, 4 Drawing Figures

FLUID FLOW CONTROL VALVES

This invention relates to fluid flow control valves of the kind which includes a piston having at least one land moving past at least one port in a cylinder wall. The invention relates particularly, although not exclusively, to such valves when used as pilot valves to control other fluid flow control valves.

In a fluid flow control valve an important consideration is the sealing which can be effected between the lands and the cylinder in which they move to reduce to a minimum the flow past the lands. It is normally not possible to provide conventional sealing means such as rings in the lands as the lands move past ports in the cylinder wall. Accordingly the lands are usually made longer in the axial direction than would otherwise be necessary. In certain circumstances this makes timing difficult since unless the port is large the port cannot be opened to the space on one side of the land until a period of time has lapsed after the port has been closed to the space on the other side of the land. In certain circumstances the use of large ports is undesirable since they constitute a dead space containing hydraulic fluid which has to be accelerated or decelerated or compressed or decompressed when the port is opened or closed.

According to the present invention, in a fluid flow control valve having a piston having a land arranged to move past port means in the cylinder wall, the port means has a dimension in the axial direction which is greater than its dimension in the circumferential direction. Normally ports in fluid flow control valves are of circular cross-section since this is the most convenient for manufacture. By means of the present invention, the total cross-section of the port means is less than the area of an equivalent port of circular cross-section and with a diameter equal to the axial length of the port means. Preferably also the maximum circumferential dimension of the port means is not greater or at least not substantially greater than the maximum cross-section of the passage leading from the port means. In this way it is possible to make the effective length of the port means fairly large without the port means introducing a large volume.

The port means may be constituted by a groove or slot extending axially along the wall of the cylinder but preferably it is constituted by at least two (but preferably two) bores which are spaced axially from one another and passage means in the cylinder wall interconnecting the bores. For example, there may be two axially spaced radial bores interconnected by an axial bore which may be a continuation of an axial passage connecting the port means to external equipment. In this case each bore preferably has the same cross-sectional area as the passage leading from the port means.

The invention is particularly applicable to apparatus of the kind comprising a double acting working piston disposed within a working cylinder between which and the working piston relative reciprocation is caused by variations produced by a control valve which is itself controlled by lands on the working piston moving past ports in the working cylinder so that the working piston has the function of a pilot valve. Such apparatus is described in U.S. Pat. No. 3,192,717 to Lee and U.S. Pat. No. 3,186,169 to Hauser. It has been found that in such reciprocating apparatus the porting of the pilot valve function of the main piston is of great importance if smooth and efficient operation is to be achieved. The volume contained in the ports and in the passages connecting the pilot ports in the working cylinder to the control valve should be as small as possible so that the control valve will be changed over as rapidly as possible. There is also the requirement referred to above that at least one of the ports opens to the chamber on one side of a land on the working piston substantially simultaneously with the closing to the chamber on the other side of the land. These two requirements indicate a narrow land and therefore conflict with the desirability as mentioned above of a broad land to provide good sealing between the chambers on opposite sides of the land. Good sealing is, of course, of particular inportance where, as here, the chamber to be sealed is the working chamber of the apparatus concerned. By constructing the control valve in accordance with the present invention, the land can be made of sufficient length to produce the required degree of sealing between the land and the cylinder wall while the port means doew not have a large volume.

These and other advantages and features of the invention will become apparent from the following description taken in conjunction with the drawings, in which.

Figure 1:
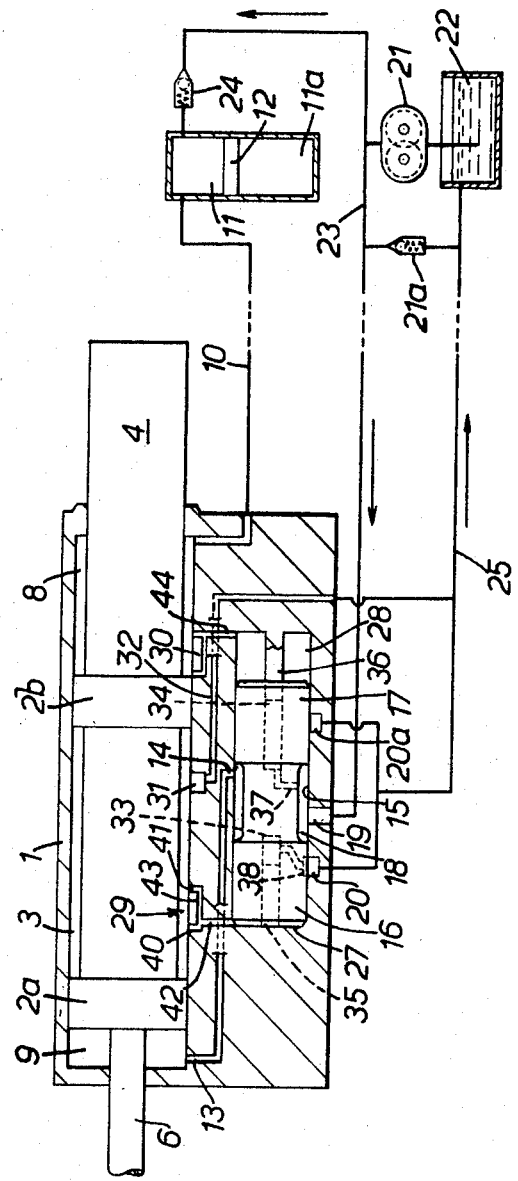
FIG. 1 shows one form of reciprocating apparatus which is similar to that shown in FIG. 1 of the aforementioned Patent but with certain ports modified in accordance with the present invention.

In the construction shown in FIG. 1 the apparatus comprises a working cylinder 1 in which a working piston reciprocates. The working piston comprises two lands 2a and 2b separated by an annular recess 3, a cylindrical projection 4 extending from one face of the working piston and a second projection 6 in the form of a piston rod projecting from the other end face of the working piston so that a working chamber 8 of smaller cross-sectional area is formed at one end of the working cylinder 1 and a working chamber 9 of larger cross-sectional area is formed at the other end of the working cylinder 1.

Communicating freely through a passage 10 with the working chamber 8 is the liquid chamber 11 of a hydraulic accumulator 11a of the gas-loaded type, the piston of which is indicated at 12. The working chamber 9 communicates through a combined inlet and outlet passage 13 with a port 14 in the control valve cylinder 15 containing a shuttle type hydraulically-operated control valve comprising two lands 16 and 17 separated by an annular recess 18. Also formed in the control valve cylinder 15 is an inlet port 19 and two relief ports 20, 20a.

A continuously driven pump 21 is provided for the delivery of working liquid to the apparatus, this pump being arranged to draw working liquid from a reservoir 22 and deliver pressurized fluid to passage 23. The delivery passage 23 is connected through a non-return valve 24 to the liquid chamber 11 of the accumulator 11a and is directly connected to the inlet port 19 while the relief ports 20, 20a are connected to the reservoir 22 by a relief passage 25. A pressure relief valve 21a is provided adjacent the pump to prevent damage in the event of a blockage occurring. The lengths of the passages 10, 23 and 25 are long compared to the other passages and accordingly are indicated by broken lines.

Formed respectively in the ends of the control valve are cylindrical bores or cylinders 33, 34 into which extend pistons 35, 36 secured to the ends of the control valve cylinder, these pistons and cylinders constituting holding piston and cylinder assemblies. The cylinder 34 communicates through a passage 37 with the recess 18 while the cylinder 33 communicates with a port 38 in the circumference of the control valve.

It will be seen that actuating liquid chambers 27, 28 are formed respectively at the ends of the control valve cylinder 15, and these chambers communicate respectively with port means 29 and 30 formed in the working cylinder 1, which is also provided with a port 31 communicating, through a relief passage 32, and the passage 25 with the reservoir 22.

The port means 29 and 30 are substantially the same so only port means 29 will be described in detail. It consists of two circular ports 40 and 41 each of which is formed by a radially extending drilling of circular cross-section, the axes of the two drillings lying on the generatrix of the cylinder, and a connecting passage 43 which is formed by a similar axially extending drilling. The distance in an axial direction from the left hand side of the port 40 to the right hand side of the port 41 is equal to the thickness measured in an axial direction of the land 2a. The port means is connected, in the case of the left hand port means 29 as seen in the drawing, to the chamber 27 by a passage 42, the cross-sectional area of which is the same as the cross-sectional area of each of the ports 40 and 41. The port means 30 is connected to the chamber 28 by a passage 44.

Operation of the apparatus is described in detail in the aforementioned Patent. However, a brief description will now be given. Assuming the parts to occupy the position shown in FIG. 1, pressurized fluid is delivered from the pump 21 through the inlet port 19 and the port 14 to the chamber 9 at the left hand end of the working cylinder so that the working piston is moved to the right. Fluid is expelled from the chamber 8 into the hydraulic accumulator 11a and its pressure progressively increased. For a time the chamber 3, which is permanently connected through the port 31 to relief passage 25, is in connection with the chambers 27 and 28 at each end of the control valve shuttle 16, 17, 18. After the working piston has travelled a certain distance to the right, the land 2a will begin to pass the port means 29. The port 40 will first be covered by the land and eventually the port 41 will also be completely covered. At the instant the port 41 becomes completely covered the port 40 will begin to become open to the chamber 9. Pressure fluid is then supplied through the chamber 9 and the port 40 to the chamber 27 at the left hand end of the shuttle which, because of the small volume of fluid contained in the port means 29 and the connecting passage 42, will rapidly move to the right hand end, thus connecting the chamber 9 through the passage 13 and the recess 18 in the valve shuttle to the relief port 20a. The pressure in the chamber 8, which is at the pressure to which the hydraulic accumulator 11a has been raised, then causes the working piston to move to the left. The port means 30 which initially is open to the annular recess 3 is progressively covered by the land 2b and at the instant that the right hand port of the port means 30 becomes open to the chamber 8 the left hand port of the port means 30 is closed by the land 2b. Accordingly, pressure fluid flows from the working chamber 8 to the chamber 28 to move the valve shuttle to the left back to the position shown in the drawing. This occurs extremely rapidly in view of the small volume of hydraulic fluid contained in the port means 30 and the passage 44 connecting the port means to the chamber 28.

It will be appreciated that the port means 29 and 30 may be modified in various ways. For example, there may be more than two individual ports connected to the passages 42 and 44 or, at the extreme, the ports may become merged into one another to form a single groove or slot. Although the minimum dead space is produced by an arrangement in which opposite ends of the port means lie on the same generatrix, this is not absolutely essential and they may be displaced circumferentially relative to one another.

Figure 2:
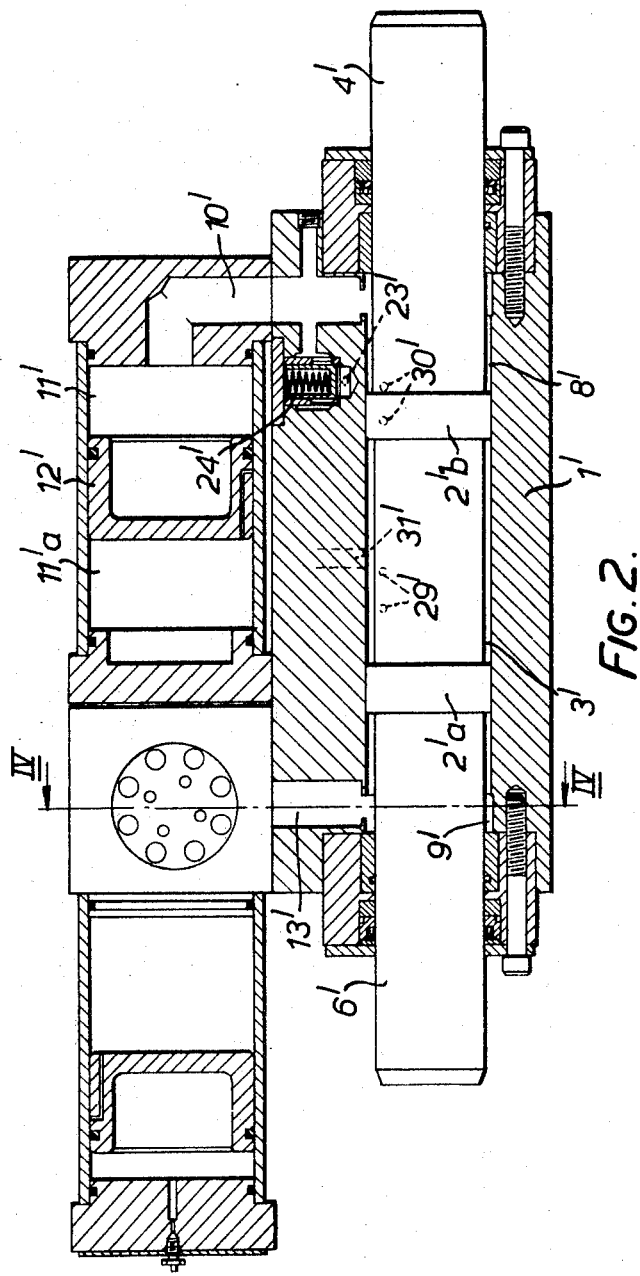
FIG. 2 is a longitudinal section through a modified form of reciprocating apparatus similar in its operating principles to that shown in FIG. 1.
Figure 3:
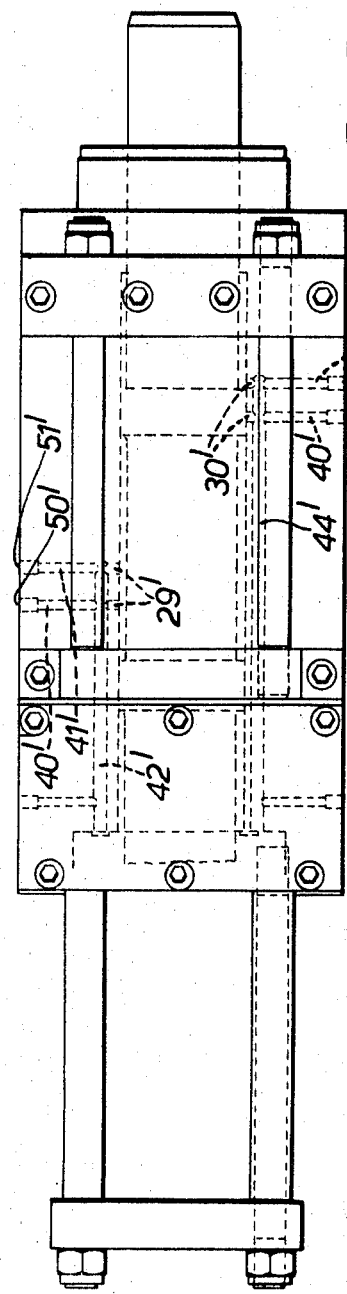
FIG. 3 is a plan view of the apparatus shown in FIG. 2.
Figure 4:
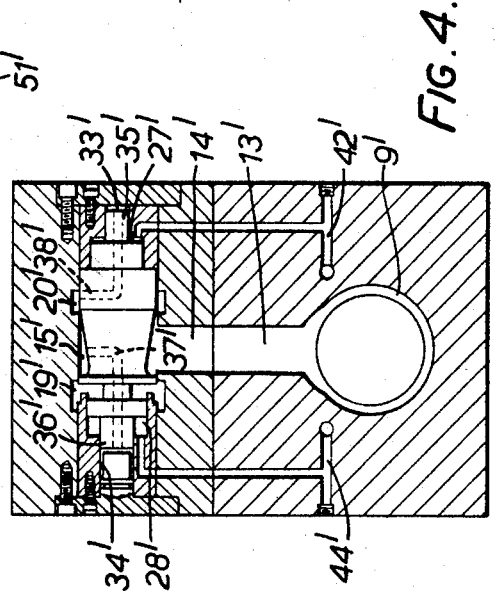
FIG. 4 is a cross-section on the line IV—IV in FIG. 2.

The apparatus shown in FIGS. 2 to 4 differs constructionally in minor respects from that shown in FIG. 1 but operates on similar principles. In view of the similarities the same reference numerals but distinguished by a prime have been used to identify similar parts.

The apparatus comprises a working cylinder 1' in which a working piston reciprocates. The working piston comprises two lands 2'a, 2'b separated by an annular recess 3', a cylindrical projection 4' extending from the land 2'b and a similar projection 6' projecting from the land 2'a, the projection 6' having a slightly smaller diameter than the projection 4' so that a working chamber 8' is formed at one end and a working chamber 9' of slightly larger cross-section is formed at the other end of the working cylinder 1'. The apparatus forms the drive portion of a percussive tool such as a rock drill or concrete breaker and is mounted in a housing, not shown. The housing also carries bearings in which is mounted the replaceable bit of the tool; the end of the bit remote from the cutting end is secured to or pressed against the free end of the projection 6'. The housing and bit are not shown in the drawings as their construction will be readily apparent to those skilled in the art and is not important to the present invention.

The aparatus includes a gas-loaded hydraulic accumulator 11'a having a piston 12'. The liquid chamber 11' of the accumulator is permanently connected through a passage 10' with the working chamber 8' of the working cylinder, the passage 10' being in turn connected through a non-return valve 24' with a pressure supply passage 23'.

The working chamber 9' communicates through a combined inlet and outlet passage 13' with a port 14' in the control valve cylinder 15' containing a shuttle-type hydraulically operated control valve having a slightly different construction from that shown in FIG. 1, but operating in the same manner. Also formed in the control valve cylinder 15' is an inlet port 19' and a relief or exhaust port 20'. Extending from each end of the control valve spool are pistons 35' and 36' which move in cylindrical bores or cylinders 33' and 34' in the control valve. These pistons and cylinders constitute holding piston and cylinder assemblies. The cylinder 34' communicates through a passage 37' with the annular chamber formed between the lands on the shuttle and hence with the exhaust port 20' when the control valve shuttle is in the position shown, while the cylinder 33' communicates with a port 38' in one land of the shuttle which, when the shuttle is in the position shown, is also open to the exhaust port 20'.

It will be seen that actuating chambers 27', 28' are formed respectively at the ends of the control valve cylinder 15' and these chambers communicate respectively with port means 29' and 30' formed in the working cylinder 1' which is also provided with a port 31' communicating through a relief passage 32' (not shown) with a reservoir. Each of the port means 29' and 30' consists of two circular ports 40' and 41' which, as can be seen in FIG. 3, are formed by drillings extending from the outside of the cylinder 1' and permanently closed by plugs 50' and 51'. The distance in an axial direction from the left-hand side of the port 40' to the right-hand side of the port 41' is equal to the thickness measured in an axial direction of either of the two lands 2'a and 2'b. The left hand port means is connected to the chamber 27' by a passage 42' the cross-sectional area of which is substantially the same as the combined cross-sectional areas of ports 40' and 41'. The port means 30' is connected to the chamber 28' by a passage 44'.

Operation of the apparatus shown in FIGS. 2 to 4 is substantially the same as that shown in FIG. 1 except that modifications to the form of the control valve shuttle lead to slight differences which will be readily apparent to the expert. The sequence of operation is the same and it is believed that it is unnecessary to describe it in detail

I claim:

1. In a fluid flow control valve having a piston having a land arranged to move past port means in the cylinder wall, the improvement which comprises said port means having a dimension in the axial direction which is greater than its dimension in the circumferential direction.

2. A valve according to claim 1 wherein said port means is constituted by at least two bores which are spaced axially from one another and by passage means in said cylinder wall interconnecting said bores.

3. A valve according to claim 2 which includes a passage one end of which opens to said port means, each of said bores having the same cross-sectional area as said passage.

4. A valve according to claim 1 wherein said piston is a double acting working piston and said port means are connected to a control valve arranged to be controlled by the lands on said piston moving past said port means and to control the flow of working fluid to said cylinder.

5. A percussive tool comprising a working cylinder containing a double-acting working piston carrying first and second lands to form an annular space between them and two working chambers at opposite ends of the cylinder of different cross-sectional areas, the working chamber of smaller cross-sectional area being connected to a hydraulic accumulator and, through a non-return valve, to a source of pressure fluid, an inlet passage for pressure-fluid, an outlet passage for exhaust fluid, a control valve having two positions which respectively connect the working chamber of greater cross-sectional area to the inlet passage and the outlet passage, first and second port means in the wall of said working cylinder located for obturation by said first and second lands respectively, said first port means opening to the working chamber of smaller cross-sectional area or said annular space depending on the postition in said working cylinder of said first land and said second port means opening to the working space of larger cross-sectional area or said annular space depending on the position in said working cylinder of said second land, said first port means being connected to direct pressure fluid to said control valve to tend to move said control valve to said second position and said second port means being connected to direct pressure fluid to said control valve to tend to move said control valve to said first position, each of said port means having a dimension in the axial direction which is greater than its dimension in the circumferential direction.

6. A tool according to claim 5 wherein said port means is constituted by at least two bores which are spaced axially from one another and by passage means in said cylinder wall interconnecting said bores.

7. A tool according to claim 6 wherein the axial distance between the axially most distant parts of said two bores is approximately equal to the axial breadth of the respective land.

* * * * *